UNITED STATES PATENT OFFICE.

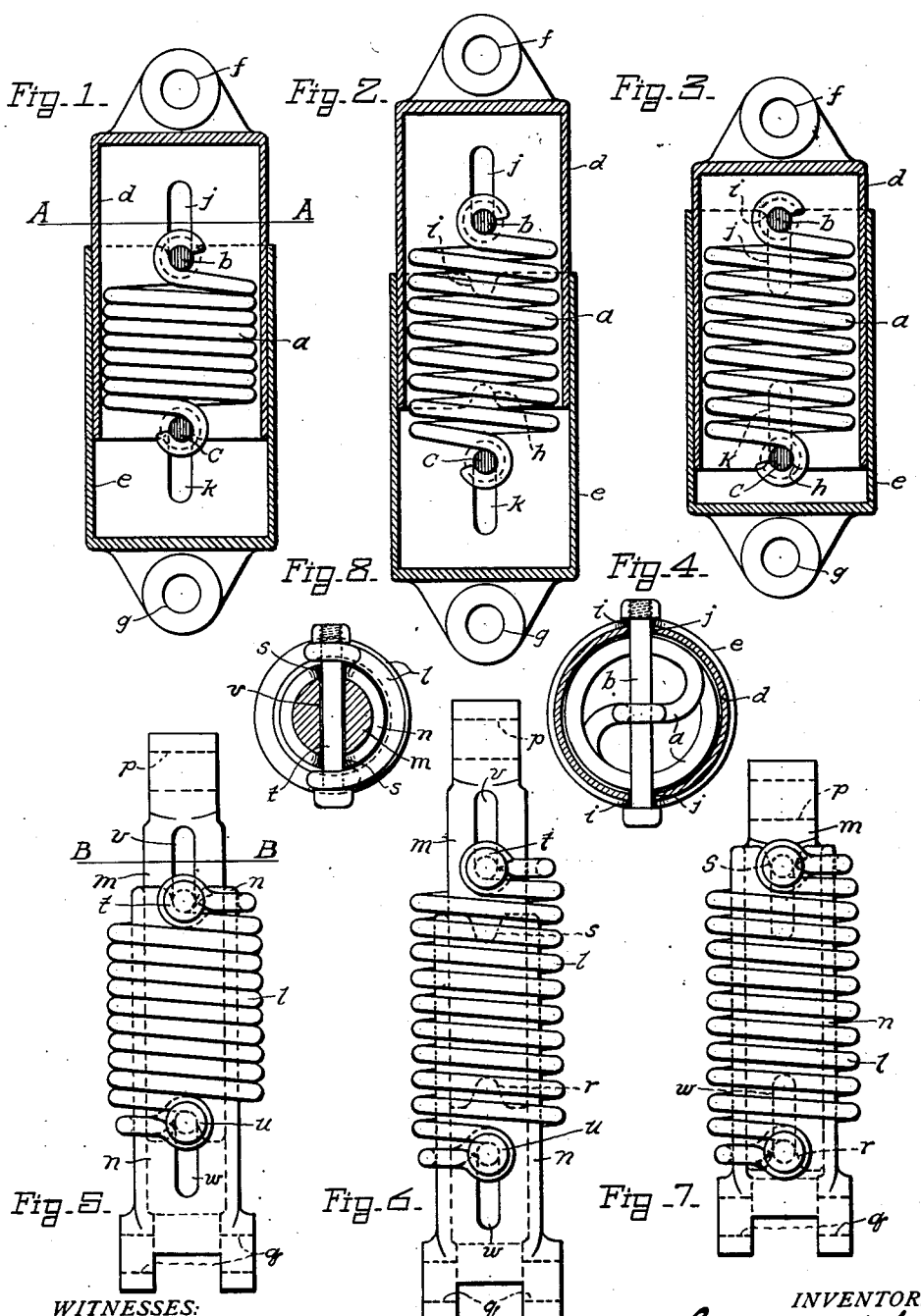

CHARLES W. JONES, OF ARLINGTON, MASSACHUSETTS.

YIELDING UNIT.

1,189,963.  Specification of Letters Patent.  Patented July 4, 1916.

Application filed February 4, 1915. Serial No. 6,189.

*To all whom it may concern:*

Be it known that I, CHARLES W. JONES, of Arlington, in the county of Middlesex and State of Massachusetts, have invented certain new and useful Improvements in Yielding Units, of which the following is a specification.

This invention relates to improvements in yielding units such as are used to connect two bodies by a yielding connection, and it has for its objects to produce a strong, durable, and effective unit.

The invention is carried out substantially as described hereinafter and illustrated in the accompanying drawing which forms an essential part of this specification and whereon like characters refer to like parts wherever they occur on the different parts of the drawing.

On the drawing, Figure 1 represents a sectional side elevation of the preferred arrangement of my improved yielding unit showing the same in its normal condition. Fig. 2 represents a similar view of the unit shown in Fig. 1 but showing the same increased in length. Fig. 3 represents a similar view of the unit shown in Fig. 1 but showing the same decreased in length. Fig. 4 represents a cross section of the unit on the line A—A in Fig. 1. Figs. 5, 6, and 7 represent views similar to those shown in Figs. 1, 2, and 3 respectively, but of a modified form of the device. Fig. 8 represents a cross section of the unit on the line B—B in Fig. 5.

In a device of this kind, where a metal spring is used as the yielding medium, it is essential that the spring should never be put under stress by movements of the same in both directions and to accomplish this object I use an extension spring, preferably of the close-coil type and so attach the spring to an operating mechanism that the movements of such mechanism either to increase or to diminish its length will act upon the spring tending to increase its length and therefore apply tension thereto.

Referring to Figs. 1, 2, 3, and 4, $a$ represents a close-coil or extension spring shown in its normal condition in Fig. 1. The ends of the spring $a$ are provided with the pins $b$ and $c$ attached thereto, one at each end thereof. Two longitudinal sliding members $d$ and $e$ which are preferably in the form of tubes, one within the other, are provided with means of attachment whereby the unit is attached to the two bodies for which it is to form a yielding connection. This connection is preferably made by means of the pivotal connection $f$ at the end of the sliding member $d$ and the pivotal connection $g$ at the end of the sliding member $e$ or this connection may be made in any other suitable and well known manner.

The open end of the tube $d$ is provided with the forked recess or notch $h$ shown by dotted lines in Fig. 2 and which receives the pin $c$ on the end of the spring and the open end of the tube $e$ is provided with the forked recess or notch $i$ shown by dotted lines in Fig. 2 and which receives the pin $b$ on the opposite end of the spring. The tube $d$ is provided on opposite sides with the slotted perforations $j$ which receive and form guides for the ends of the pin $b$ and the tube $e$ is also provided on opposite sides with the slotted perforations $k$ which receive and form guides for the ends of the pin $c$.

The slotted perforations $j$ and $k$ are of such a length and are so located that, in connection with the pins $b$ and $c$ which enter said perforations, they form a limit to the sliding movements of the longitudinally sliding members $d$ and $e$ relative to each other. Thus the variations in the lengths of the unit are limited in this manner.

The action of this yielding unit is substantially as follows: With the parts in their normal positions shown in Fig. 1 the coils of the spring are closed and a sliding movement of the members $d$ and $e$ in either direction will cause an action of the spring $a$. When the members $d$ and $e$ are moved toward each other as shown in Fig. 3 the recesses or notches on the ends of the sliding members engaging the pins $b$ and $c$ on the spring $a$ will move said pins apart and thereby cause an increasing tension to be applied to said spring which tension will offer an increasing resistance to the movements of the sliding members in that direction. A continued movement of the parts in this direction will cause the parts of the unit to assume the relative position shown in Fig. 3 in which the spring $a$ is put under the greatest tension it is possible to apply by the movement in this direction and the movements of the members $d$ and $e$ will be limited by the pins engaging the opposite ends of the slotted perforations $j$ and $k$ to that shown in Fig. 1 and as shown in Fig. 3.

When the members $d$ and $e$ are moved from their relative positions shown in Fig. 1 and away from each other as shown in Fig. 2 the pins *b* and *c* on the ends of the spring *a* being in engagement with the inner ends of the respective slotted perforations *j* and *k* will cause an extension of the spring thus increasing the tension thereon and increase the yielding resistance to the further movement of the members *d* and *e* in that direction.

Referring to the modified form of the device as shown in Figs. 5, 6, 7, and 8, the yielding medium consists of the close coiled spring *l* similar to that above described and the opposite ends of which are provided with an eye or other means whereby it can be attached to or operated upon by the sliding members. These sliding members have been shown as consisting of a link made in two pieces *m* and *n*, the member *m* fitting and sliding within the member *n* so as to keep them in proper alinement during their sliding movements.

The member *m* is preferably provided with the perforation *p* whereby it may be pivotally connected to the body for which the device is to form a yielding connection and the member *n* is preferably provided with the perforation *q* whereby the opposite end of the yielding unit may be pivotally connected to the other body for which the unit is to form a yielding connection. The member *m* is provided on its end opposite to the perforation *p* with a fork or recess *r* shown in dotted lines in Fig. 6 and the member *n* is provided on its end opposite to the perforation *q* with a fork or recess *s* shown in dotted lines in Fig. 6, which forks or recesses *s* and *r* engage the respective pins or bars *t* and *u* which pass through the eyes at the opposite ends of the yielding medium *l*. The pins or bars *t* and *u* also pass through the respective slotted perforations *v* and *w* in the respective longitudinally sliding members *m* and *n*. These slotted perforations are so arranged upon the longitudinally sliding members that they will allow said members to slide together and reduce the distance between the pivotal connections *p* and *q* thereon without causing the member *m* to act upon the bar *t* or the member *n* to act upon the bar *u* until the bars reach the ends of the slots through which they pass and as shown in Fig. 7 at which position the inward or contracting movements of the sliding members are limited and the unit becomes a solid or rigid connection in that direction as the bar *t* rests within the fork *s* on the member *n* and the bar *u* rests within the fork *r* on the member *m*, also the bar *t* is at the extreme end of the slotted perforation *v* in the member *m* and the bar *u* is at the extreme end of the slotted perforation *w* in the member *n*. This action of the sliding members *m* and *n* reduces or contracts the length of the yielding unit but at the same time it increases the length of the yielding medium *l* as will be clearly seen by reference to Fig. 7 of the drawing.

If the sliding members *m* and *n* are drawn apart so as to increase the length of the yielding unit and consequently increase the distance between the pivotal connections *p* and *q*, the forks or recesses *r* and *s* will be withdrawn from contact with the respective bars *u* and *t*, also the bars which are in engagement with the inner ends of the slotted perforations *v* and *w* will cause an increase in the length of the yielding medium *l* and apply tension thereto, substantially as shown in Fig. 6. It will also be seen that the action of the yielding medium will cause the bars *t* and *u* to normally rest within the respective forks *s* and *r* and against the inner ends of the respective slotted perforations *v* and *w* as shown in Fig. 5 which is thus the normal position of the parts.

It will be understood that any initial tension may be applied to the yielding medium when in its normal position if so desired, thus making it necessary to have a certain amount of force applied to the sliding members before said sliding members can be moved in either direction whether it be to increase or decrease the length of the unit.

When the yielding unit is to be used in a position where it is liable to accumulate dust and dirt, the construction shown in Figs. 1, 2, 3, and 4 is the preferred construction, as the sliding members being tubular in form and sliding one within the other form a casing within which the yielding medium is located and by which it is protected from dust and dirt. If there is a limited amount of space where the unit is to be used it may be preferable to employ the construction of unit shown in Figs. 5, 6, 7 and 8, as the same is more compact and less bulky.

Having thus fully described the nature, construction, and the operation of my improved device, I wish to secure by Letters Patent and to claim:

1. An elastic connecting device between two bodies, comprising members slidable longitudinally with relation to each other and having means of connection to said bodies, a yielding medium, and connections at the opposite ends of the yielding medium between said yielding medium and each of the sliding members, whereby the yielding medium will be lengthened by a movement of the sliding members in either direction.

2. An elastic connecting device between two bodies, comprising members slidable longitudinally with relation to each other and having means of connection to said bodies, an extension spring, and connections at the opposite ends of the spring between said spring and each of the sliding members, whereby tension will be applied to the spring by a movement of the sliding members in either direction.

3. An elastic connecting device between two bodies, comprising slotted members slidable longitudinally with relation to each other and having means of connection to said bodies, a yielding medium, and a bar at each end of the yielding medium, each bar passing through the slotted perforation in one of the sliding members and engaged by the end of the other sliding member, whereby the yielding medium will be lengthened by a movement of the sliding members in either direction.

4. An elastic connecting device between two bodies, comprising two slotted tubular members slidable one within the other and forming a tubular casing, each member having means of connection to said bodies, a yielding medium within the tubular casing and a bar at each end of the yielding medium, each bar passing through the slotted perforations in one of the sliding members and engaged by the end of the other sliding member, whereby the yielding medium will be lengthened by a movement of the sliding members in either direction.

In testimony whereof I have affixed my signature, in presence of two witnesses.

CHARLES W. JONES.

Witnesses:
HELENA A. MURPHY,
ROBERT T. RUSSELL.